United States Patent [19]

Frank et al.

[11] 4,073,502
[45] Feb. 14, 1978

[54] RETRACTABLE STEP

[76] Inventors: Raymond C. Frank, 4083 Second St., Brown City, Mich. 48416; Ronald R. Frank, 2051 Forest Drive, Lapeer, Mich. 48446

[21] Appl. No.: 697,959

[22] Filed: June 21, 1976

[51] Int. Cl.² .............................................. B60R 3/02
[52] U.S. Cl. ................................................... 280/166
[58] Field of Search ................. 280/166; 105/444, 445, 105/446, 447, 448; 182/88

[56] References Cited

U.S. PATENT DOCUMENTS

| 3,762,742 | 10/1973 | Bucklen | 280/166 |
| 3,887,217 | 6/1975 | Thomas | 280/166 |

FOREIGN PATENT DOCUMENTS

| 845,429 | 8/1939 | France | 280/166 |
| 934,387 | 8/1963 | United Kingdom | 280/166 |

*Primary Examiner*—Robert R. Song
*Attorney, Agent, or Firm*—Dale Austin Winnie

[57] ABSTRACT

A retractable step for camper-trailers, motor homes and other uses, and comprising; a supporting member which is mounted under a doorway and has a step member connected to it by pivotal linkage which enables the step member to be raised and retracted under the threshold of the doorway for storage or lowered and extended in front of it for use; and with means for biasing the step member into its usable position and other means responsive to vehicle engine vacuum pressure for automatically retracting it into storage.

3 Claims, 7 Drawing Figures

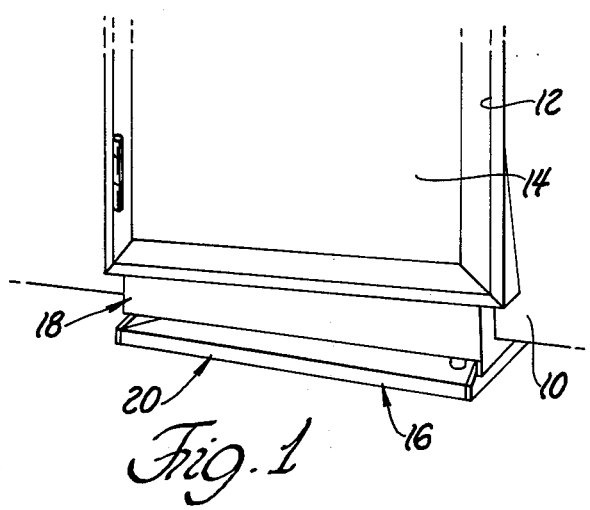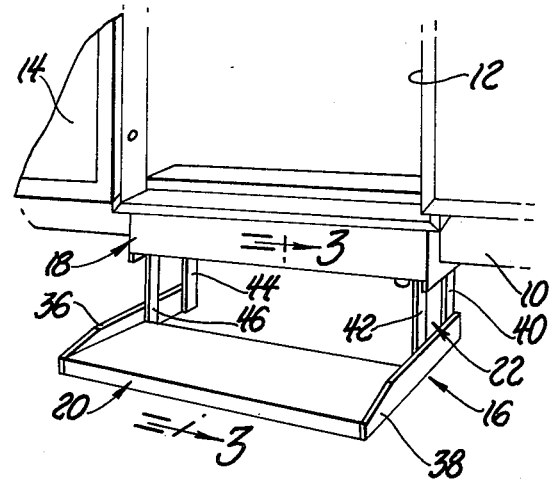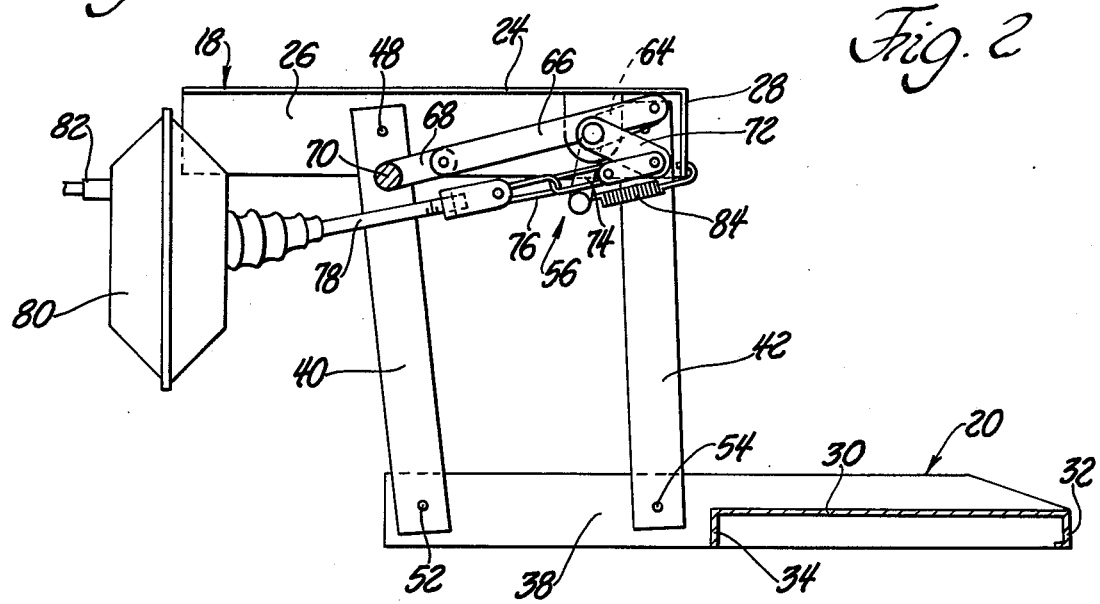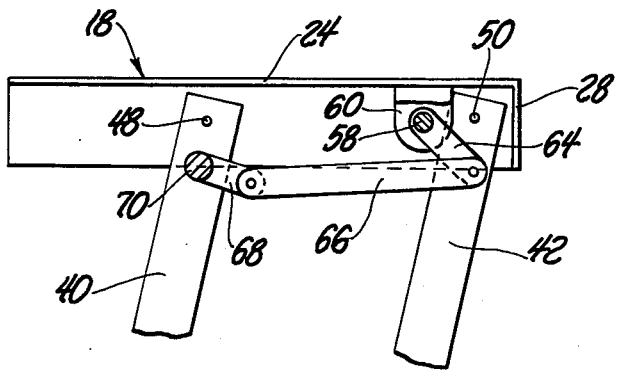

RETRACTABLE STEP

BACKGROUND OF THE INVENTION

Most camper trailers, motor homes and the like, which are required to have a certain ground clearance for highway travel, have a floor level which is sufficiently above ground level to need a couple of steps to gain access thereto.

Although one step can usually be provided right inside the vehicle, at the doorway, there is usually at least one step that is needed outside the vehicle and it is this step that presents the greatest problems.

Some people use a wooden box or a make-shift step, which they put out each time it is needed and take in when they are ready to move on. However, this is a great inconvenience and it is also very unsafe; since the box or make-shift step is not fastened down and can be unintensionally moved out of place or tipped over.

Weighting or fastening the step down only adds to the inconvenience of putting it out and taking it in each time, so this is no solution.

A step which is hinged or otherwise connected at the threshold to extend out and down for use and be swung back in or otherwise kept in the doorway for use when needed has also proven unacceptable because it is cumbersome to use, inconvenient during travel stops, and particularly annoying during inclement weather due to the time required to position it and/or store it away and the need to clean the step after each use.

Although retractable steps which are housed under the doorway have been proposed, none of these have proven too acceptable either. Those which are manually operated are inconvient to get at and operate, and consequently are seldom used during travel stops. Those which are power operated require a source of power to operate them, which is not always available during travel or at all stops, and the motor that is used adds considerably to their expense.

Retractable steps as presently known are also easily forgotten and left out when they shouldn't be and as a consequence of their low hanging disposition are easily damaged or broken-off.

What is needed is a power operated retractable step which does not use a motor, which is mounted under a doorway and lowered and extended for use when needed, is automatically retracted and stored away when the vehicle is to be moved, and which is still available for use at any time, when and as needed, during travel stops.

SUMMARY OF THE PRESENT INVENTION

The present invention is a retractable step which includes all of the advantages last mentioned.

It includes a supporting structure, which is mounted under a doorway, and has a step member connected to it by suitable pivotal linkage which enables the step member to be raised and retracted up under the supporting member or swung down and out, relatively in front of the doorway, ready for use.

The step member has sufficient weight, is so hinged, and is biased to assume a depending and forwardly extended position. It also includes operative linkage which locks it in the down and forward position so that the step is safe for use.

The step member is retracted by a power operated means which is connected to a vacuum power source; namely the engine vacuum of whatever vehicle means or engine is used as the motive force for the camper trailer, motor home, etc. As a consequence, whenever the drive vehicle is started and made ready to move, the step is retracted and automatically put in safe storage, under the doorway. At the same time, by use of a simple door operated cut-off switch, to interrupt the vacuum connection, whenever the door is opened, and the step is needed, as during travel stops, it will be automatically lowered and positioned for use.

DESCRIPTION OF THE DRAWING FIGURES

FIG. 1 is a perspective view of the lower part of a doorway in a motor home, showing the retractable step of the present invention as mounted under the entranceway and retracted back up and out of the way.

FIG. 2 is similar to FIG. 1, with the step shown lowered and extended for use.

FIG. 3 is an enlarged cross-sectional view, taken in the plane of line 3—3 in FIG. 2, showing the operating mechanism for the retractable step.

FIG. 4 is similar to FIG. 3, but of part of the operating mechanism and with the step supporting linkage shown in a different position, starting to retract the step member.

Figure 5:
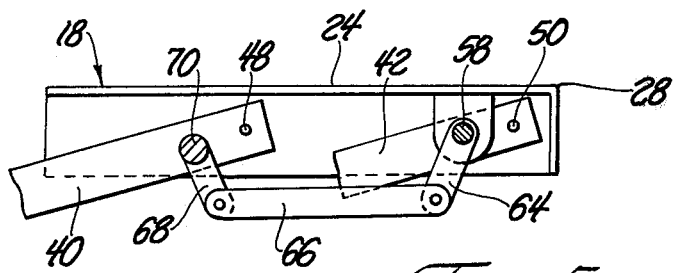
FIG. 5 is similar to FIG. 4, with the operating mechanism that is shown in the position that it is in when the step is fully raised and retracted back up under the doorway.

DETAILED DESCRIPTION OF THE ILLUSTRATED EMBODIMENT:

In the first two drawing figures is shown the side of a motor home 10 with a doorway 12, a door 14 hung in the doorway, and a retractable step 16 mounted under the doorway.

The retractable step 16 includes a supporting member 18, which houses the operating mechanism and is mounted right under the threshold of the doorway, and a step member 20 which is connected to the supporting member by pivotal linkage 22 at each side which allows it to assume a first position raised and retracted out of the way and a second position lowered and extended for use.

As shown in FIG. 3 and the subsequent drawing figures, the step supporting member 18 is essentially a heavy gauge sheet metal member formed to include a protective cover wall 24 with depending side wall flanges 26, and a front wall flange 28, within the protection of which is mounted the operating mechanism for the retractable step.

The step member 20 includes an actual step part 30, having its front and back edges turned down, as at 32 and 34. for added strength, and with side rails 36 and 38 which extend rearwardly behind the step proper on each side. Each side rail is connected to the depending side wall flange 26 of the supporting member by a pair of links, 40 and 42 on one side and 44 and 46 on the other side, which serve as the pivotal linkage 22 mentioned previously.

The upper ends of each link is pivotally connected to the supporting member side wall flange, as at 48 and 50, and to the side rails of the step member as at 52 and 54; as is shown in FIG. 3 with respect to links 40 and 42. The respective pivotal points are spaced apart alike but not necessarily exactly similar distance so that the linkage serves like a parallelogram linkage to maintain the step member relatively horizontally disposed and in parallel spaced relation to the supporting member 18 both as received close up under it, as extended down and out in front of it and as moved during translational movement therebetween.

Figure 6:
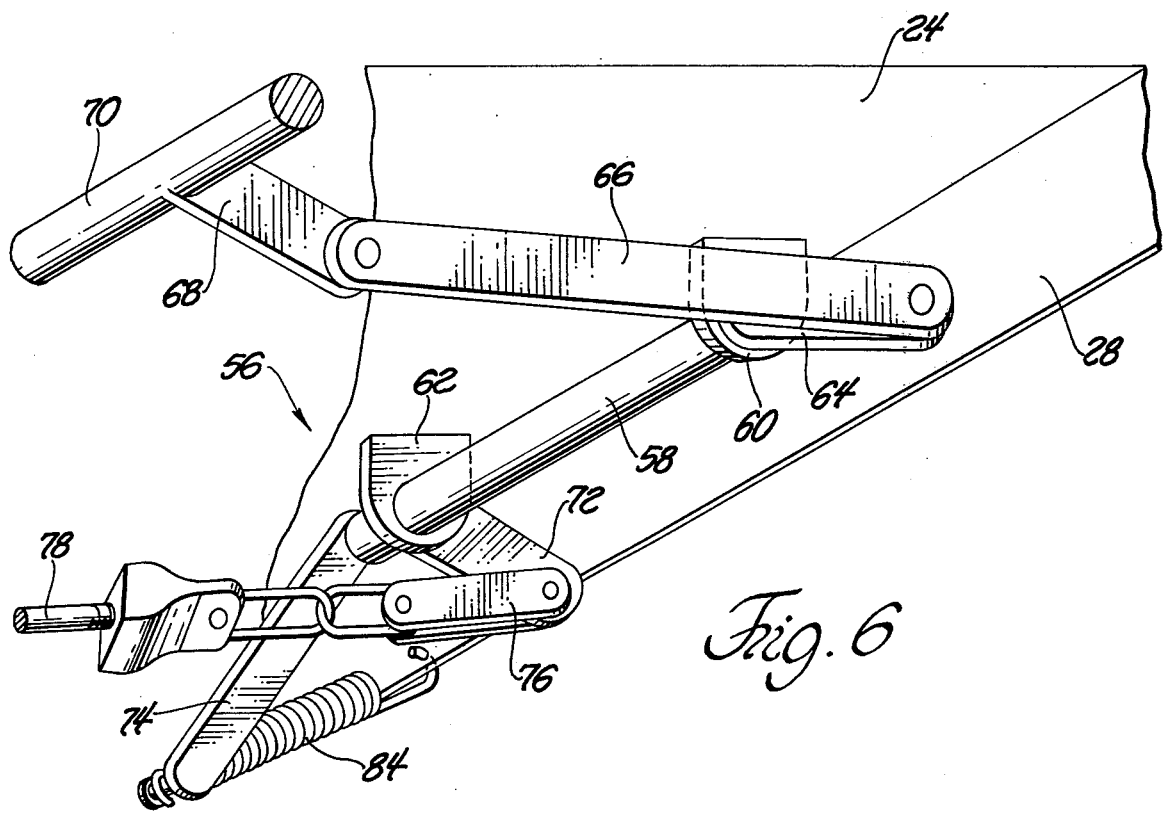
FIG. 6 is a fragmentary perspective view of the retractable step operating mechanism as seen from underneath the looking up under the step supporting member that is mounted under the doorway.

Referring now more closely to FIG. 3 and 6, operative means 56 are shown mounted on the underside of the supporting member 18 and connected to the pivotal linkage 22 to effect the raising and lowering of the step member.

A short rod 58 is supported for axial rotation within spaced supports 60 and 62 extending down from the cover wall 24 of the supporting member and near one side thereof. On one end of the short axle rod is fixed a lever arm link 64, which is pivotally connected in turn to a longer link 66 that is itself pivotally connected to a fixed arm 68 extending out from a torsion bar rod 70 that is fixed at opposite ends to the two rearmost links 40 and 44 of the pivotal linkage supporting the step member.

Although the operating linkage just described could be connected to one of the pivotal links supporting the step member, and would thereby also be capable of operating the step member through the pivotal linkage provided, the torsion bar rod 70 serves to tie both sides of the pivotal linkage that supports the step together for greater strength and rigidity, less chance of racking due to the play in the pivotal connections, and more positive response when called for.

The other end of the short axle rod shaft 58, near its other underhung support, has a lever arm 72 fixed to it and further out, at its far end, another lever arm 74, at about a 90° angle from the former. A chain link or other flexible operating connection 76 is made to the lever arm 72 and in turn to the rod end 78 of a vacuum pressure operated diaphragm member 80 mounted either on the underside of the supporting member of otherwise back under the trailer unit served.

Although not shown in detail, it will be appreciated that a vacuum pressure source connected as at 82 to the back side of the diaphragm member, and made active, will act on and draw the internal diaphragm back, retracting the rod end 78 of the diaphragm operator and through the chain link connection 76 act on the lever arm 72 to turn the axle shaft 58, and through the linkage 64, 66 and 68 act on the torsion bar 70 and cause the step member 20 to be raised and retracted up into its stored position.

The sequential movement that occurs in accomplishing this will best be appreciated by referring in succession to FIGS. 3, 4 and 5 which show the operative linkage and the pivotal linkage that supports the step member as the step member is raised and retracted back up under the supporting member.

Referring back now to FIGS. 3 and 6, it will be seen that a spring 84 is connected to the lever arm link 74 and to the depending front flange 28 of the step supporting member 18. Accordingly, it serves as a biasing means, acting with the natural weight of the step member 20, in exerting a force to lower and extend the step for use.

It also serves as can best be seen in FIG. 3, and can be appreciated in FIG. 6, to bias and hold the links 64 and 66 in an over center or lock-up relationship with respect to the pivotal axis of link 64, which happens to be the center axis of rod 58. Weight applied on the step, or any inward force, as in normal use, because of the lock-up will not act to push the step in, as would otherwise occur, since the link 66 is held over center and link 64 is bottomed out against the underside of the cover wall 24.

In order to over come this over center lock-up condition, and enable the step to be retracted, it will be noted that link 72, which is connected to rod 58 just like link 64 is, is at a different angular relationship (referring to FIG. 3) and one which causes it to be in an under center position when the other is in an over center lock-up condition, so that it is effective in rotating the stub shaft 58, causing the link 64 to move down from its over center position and to effect the raising and retracting of the step member as appreciated in following the sequences of FIGS. 4 and 5.

From the forgoing it will be appreciated that the vacuum diaphragm hook-up is effective in retracting and drawing the step member back up under the threshold of the doorway every time the diaphragm member is activated. It follows that by having the diaphragm member connected to the vehicle engine for the motor home, in this instance, or whatever drive engine is used in other instances, that whenever the engine is started, to get underway, that the step member will be automatically retracted and stored away without any manual assistance.

Figure 7:
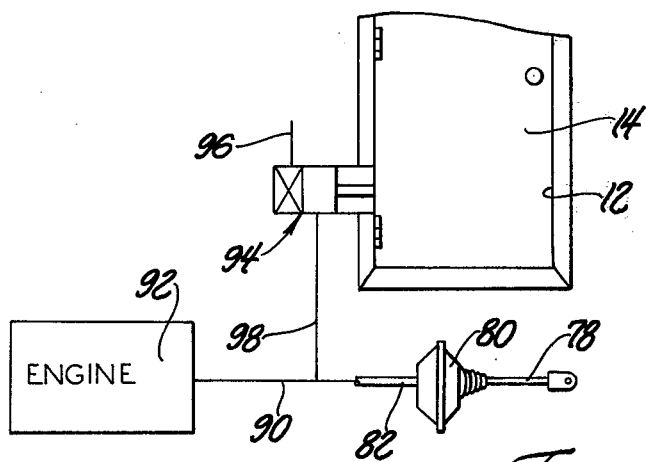
FIG. 7 is a diagramatic representation of the power source and switch connections which provide for automatic operation.

FIG. 7 diagramatically shows the vacuum pressure source connection 90, between the vehicle engine 92 and the diaphragm connection 82, whereby the retractable step mechanism is made operative. And it also shows a simple means by which the step mechanism may be made usable during travel stops, and which the vehicle engine is still running.

A vent valve 94, to vent the system to atmospheric pressure, is shown in the drawing figure as disposed within the door frame 12 at the hinged side of door 14. A solenoid operated valve and hinge disposed switch could be used in the same manner; the principal being simply that when the door is closed the vent 96 is cut off from the connecting line 98 to the system, and when the door is opened the spring activated valve means (in this instance) causes the system to be vented to atmospheric pressure which, in turn, causes the weight of the step, and biasing spring 84, to lower and extend the step ready for use.

When the door is closed, the valve is shifted and vacuum pressure is again effective to raise and retract the step. Thus, whenever the door 12 is opened, when the engine is running, as during last minute preparations and travel stops, the step will be lowered and made available for use. And, when the door is closed and the vehicle is underway, the step will be safely and securely retracted and out of the way.

From the forgoing it will be seen that the apparatus shown and described is relatively simple in construction and therefor economical to manufacture. It does not include any expensive gears, or rack and pinion operators, as might be expected, nor an electrical motor or other expensive operating mechanism. The pivotal linkage for both support and operating purposes is relatively simple, the weight of the step is used effectively to position it for use, with a simple tension spring to bias it into an over center locked position down and disposed for use, and a simple vacuum operated diaphragm device is used to retract and store the step away when it is not needed. The latter is effectively connected to the vehicle engine, as a vacuum pressure source, since when the vehicle engine is operating and the trailer or mobile home is ready to be moved is when the step is normally required to be retracted and stored away. However, by a simple switch device, at the door serviced by the step, the step is still available for use whenever the door is opened and it is automatically stored away again when the door is closed.

We claim:

1. A retractable step, comprising;

a step supporting member, a step member, pivotal linkage connecting said step member to said supporting member for movement between a first position raised and retracted up under said supporting member and a second position lowered and extended in front of said supporting member, operative means provided on said supporting member and connected to said pivotal linkage for raising and retracting said step member into said first position, biasing means connected to said operative means and acting to dispose and hold said step member in said second position, said operative means including an overcenter linkage set by said biasing means for locking said step member in said second position for safe use, power operated means connected to said operative means and having overriding opposition to said biasing means for unlocking said step member and allowing the raising and retraction thereof, said power operating means including a diaphragm operated mechanism having one side thereof connected to a vacuum pressure source and the other side to said operative means, and including door operated switch means interposed between said vacuum pressure source and said operative means for venting the system and inactivating said power operated means.

2. A retractable step and associated operating mechanism, comprising;

a step supporting member suitable for being mounted under a doorway provided within a recreational vehicle, a step member of suitable width and depth for supporting the weight of persons making use thereof and having rearwardly extending side rails on each side thereof for free hanging connection to said supporting member, pivotal links providing free hanging connection between the side rails and said supporting member and for assuring relatively horizontal translaterial movement of said step member between a first position raised and retracted up under said supporting member and a second position lowered and extended in front of said supporting member, operative means provided on said supporting member and extending therebeneath for raising and retracting said step member into said second position, said operative means including an axially rotatable member having relatively spaced and circumferentially offset lever arm connections provided thereon and a vacuum pressure responsive diaphragm operated member connected to one of said lever arm connections, a pivotal link connected between another of said lever arm connections and said free hanging pivotal links for retracting actuation of said step member, and spring means connected between still another of said lever arm connections and said supporting member for biasing said step member through said axially rotatable member into said second position and for also biasing said first mentioned other lever arm connection into an overcenter lock-up position precluding inadvertant retraction of said step member.

3. The retractable step and associated operating mechanism of claim 2, including:

door operated means for venting the vacuum system that raises and retracts said step member to insure the overcenter biased extension of said step member under said doorway when the door closure thereof is open.

* * * * *